(12) United States Patent
Steele

(10) Patent No.: US 7,330,307 B2
(45) Date of Patent: Feb. 12, 2008

(54) STAGE APPARATUS

(75) Inventor: Christopher Steele, Cambridge (GB)

(73) Assignee: Prior Scientific Instruments Ltd. (GB)

( * ) Notice: Subject to any disclaimer, the term of this patent is extended or adjusted under 35 U.S.C. 154(b) by 147 days.

(21) Appl. No.: 11/050,552

(22) Filed: Feb. 4, 2005

(65) Prior Publication Data

US 2005/0178976 A1    Aug. 18, 2005

(30) Foreign Application Priority Data

Feb. 18, 2004  (GB) ................. 0403576.2

(51) Int. Cl.
*G02B 21/26*  (2006.01)

(52) U.S. Cl. ...................... 359/391; 359/397

(58) Field of Classification Search ............. 359/391, 359/392, 393

See application file for complete search history.

(56) References Cited

U.S. PATENT DOCUMENTS

| | | | | |
|---|---|---|---|---|
| 1,876,176 A | * | 9/1932 | Sulzner ............. | 359/391 |
| 5,587,833 A | * | 12/1996 | Kamentsky ......... | 359/393 |
| 5,706,127 A | * | 1/1998 | Saito et al. ......... | 359/381 |

* cited by examiner

*Primary Examiner*—Arnel Lavarias
(74) *Attorney, Agent, or Firm*—Young Law Firm, P.C.

(57) ABSTRACT

Stage apparatus for improving the accuracy of microscope stage positioning, including a stage having a fixed portion, a platform movable relative to the fixed portion, and an integral memory device for storing data relating to the positioning of the platform.

5 Claims, 2 Drawing Sheets

STAGE APPARATUS

The present invention relates to a stage apparatus and in particular stage apparatus for improving microscope stage positioning.

DESCRIPTION OF THE RELATED ART

Microscopy systems with motorised microscope stages for the accurate positioning of a specimen being examined are well known. Typically motorised stages have one motor for moving the stage in an X direction and one for movement in the Y direction. The motors are controlled via a dedicated controller, which interfaces with a conventional computer. The stage can then be moved a desired distance in the X or Y direction either automatically by specialist software running on the computer or manually via a joystick provided for the purpose. In response to an instruction from the specialist software or the joystick the controller issues a command to the appropriate motor to move the stage a specified distance in the desired direction.

However, no motor drive mechanism is perfect and hence discrepancies arise between the desired X/Y position and the position indicated by the motors. Additional positioning errors occur because it is difficult to position the X and Y motors on perfect orthogonal axis and hence X movement and Y movement are often not exactly perpendicular. In addition to this every motor performs differently and hence every motorised stage exhibits different discrepancies at different stage locations.

Traditionally microscope stages are calibrated during installation to allow positioning discrepancies to be compensated for. Calibration data is stored on the computer and control software accesses this to compensate for the discrepancies. However, movement of the motorised stage from one microscopy system to another, for example, to replace a faulty stage can result in the wrong calibration data being used and hence inaccurate positioning.

Calibration data can also become inaccurate very quickly as a result of changes of environmental variables such as humidity and temperature over time.

BRIEF SUMMARY OF THE INVENTION

The present invention aims to provide stage apparatus, which overcomes or at least mitigates the above problems.

According to the present invention there is provided stage apparatus for improving the accuracy of microscope stage positioning, comprising: a stage having a fixed portion, a platform movable relative to the fixed portion, and an integral memory device for storing data relating to the positioning of the platform.

Preferably the memory device is an Electrically Erasable Programmable Read-Only Memory (EEPROM).

The stage apparatus may be provided with a calibration plate comprising a calibration pattern formed on a substrate.

Preferably the calibration pattern includes an arrangement of regularly spaced features.

Preferably the features are intersections between gridlines.

The stage apparatus may be provided with a detachable stage insert plate for receiving and levelling the calibration plate comprising; a lower section configured for connection to the movable platform; an upper section with a sample surface; and means for levelling the sample surface to a plane substantially perpendicular to an optical axis of the microscope; wherein, the upper section is configured to receive a calibration plate.

Preferably the insert plate further comprises means for rotating the sample surface about an axis substantially perpendicular to the sample surface.

BRIEF DESCRIPTION OF THE DRAWINGS

The invention will be now be describe by way of example only with reference to the figures in which.

DETAILED DESCRIPTION

Figure 1:
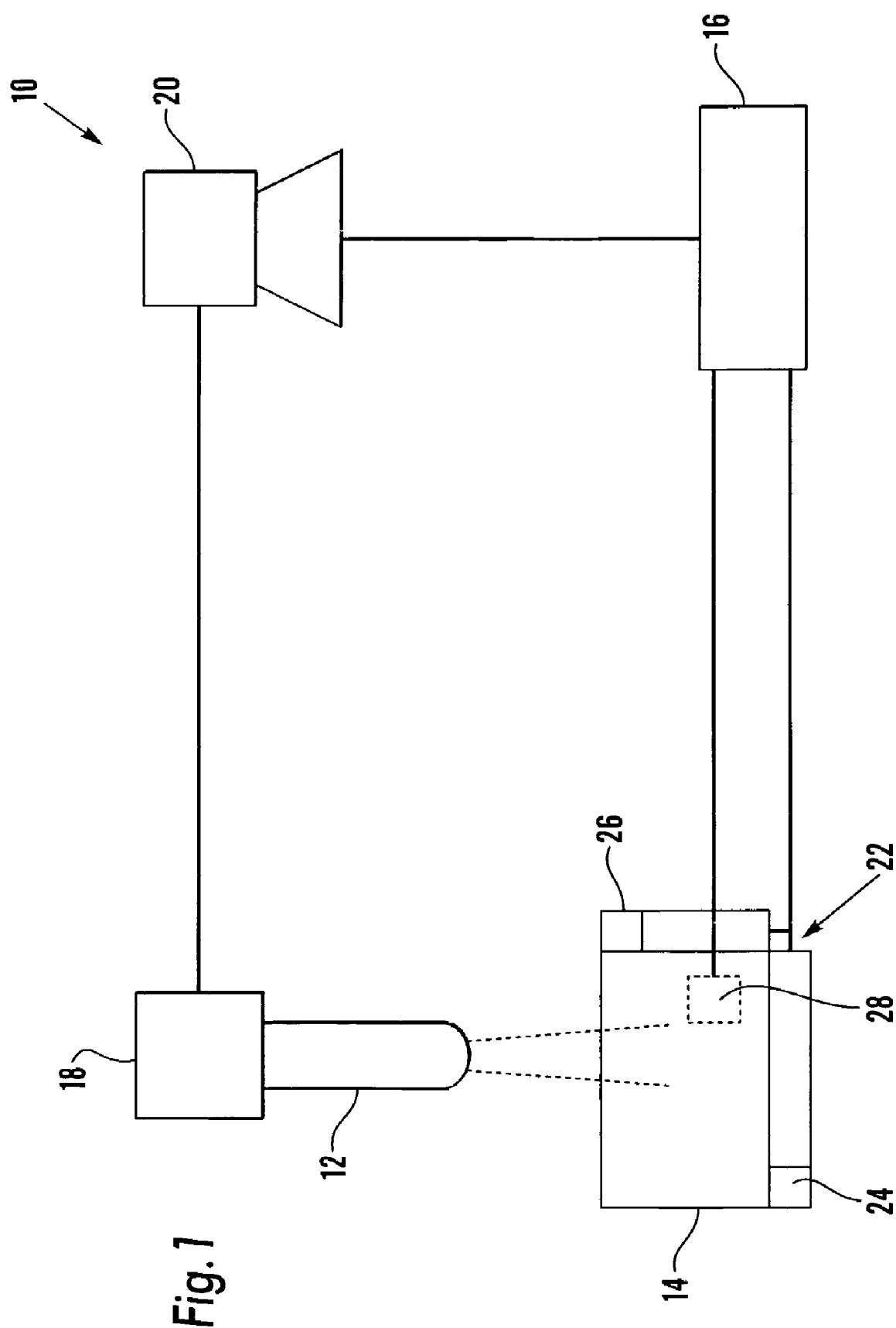
FIG. 1 shows schematic of a microscopy system.

In FIG. 1 a microscopy system is shown generally at 10. The microscopy system includes a microscope 12, a stage 14 for holding a sample, a controller 16 for controlling the stage 14 and an imaging device 18 for providing electronic images of the sample as viewed through the microscope. The microscopy system also includes a conventional computer 20.

The microscope is of any suitable conventional design having an objective lens, for example the PriorLab™ microscope sold by Prior Scientific Instruments Limited of Cambridge, UK.

Stages for microscopes are well known in the art and will not be described in detail. The stage is provided with a fixed portion for connection to the microscope 12 and a movable platform, for holding the sample. The movable platform is capable of conventional X-direction and Y-direction movement relative to the fixed portion, in a plane substantially orthogonal to the optical axis of the microscope. The stage is also provided with positioning means 22 for positioning to movable platform relative to the fixed portion. The position of the movable platform is given by a set of stage coordinates, which represent the distance of the position from any suitable origin.

The positioning means includes at least one motor 24 for positioning in the X-direction and at least one motor 26 for positioning in the Y-direction. The motors 24, 26 can be in any suitable form, for example, conventional stepper motors. Such stepper-motor driven positioning means are common in the art, for example, the mechanical microscope stages sold under the ProScan trade mark by Prior Scientific Instruments Limited. It will be appreciated that the stage can also include any other features of conventional microscope stages, such as limit switches, specimen holders and linear encoders.

In operation, the position of the movable platform is specified by a set of motor coordinates, which represent the distance moved by the movable platform under the action of the motors. Ideally the motor coordinates should correspond directly to the stage coordinates. However, in reality discrepancies arise between the position indicated by the motor coordinates and the real position indicated by the stage coordinates.

The stage 14 is further provided with an integral non-volatile electronic memory device 28 for storing data relating to the stage 14. The memory device 28 can be of any suitable form for example an Electrically Erasable Programmable Read-Only Memory (EEPROM) or FLASH memory.

In operation, the data stored in the memory device 28 includes a table of errors representing the discrepancies between the real position as indicated by stage coordinates and the position indicated by the motor coordinates. The table of errors is generated using a measurement procedure.

The controller 16 is configured to control the positioning means and hence the movement of the movable platform. The controller is also configured to control the data written to and read from the non-volatile memory. The controller 16 interfaces with the computer 20 via a suitable communications link, for example, using RS232 or USB. Alternatively the controller 16 could be in the form of a PCI card installed directly into the computer 20. Additionally a joystick may be provided for manual positioning of the platform via the controller 16.

In operation, data stored in an error table in the memory device 28 is used to compensate for discrepancies between the motor coordinates and the stage coordinates to ensure that the positioning means accurately positions the movable platform to a desired location.

The imaging device 18 is typically in the form of a conventional CCD camera adapted for connection to a specialist viewing head provided for the microscope such that the imaging device 18 can obtain an electronic image of the view through the objective lens.

The computer 20 includes application software for interacting with the imaging device 18 and the controller 16. The application software includes image analysis software, and measurement software.

The image analysis software includes image capture routines and image analysis routines. The image capture routine is operable to receive data in the form of the electronic image from the imaging device 18 via a suitable communication link and to visually display it on a screen of the computer 20. The image analysis routines are operable to analyse the electronic images received from the imaging device 18 using appropriate analysis functions. The analysis functions include a line detection function, an intersection detection function, an intersection count function and a zeroing function.

The line detection function is operable to detect any straight lines on the electronic image and to calculate a set of image coordinates corresponding to a plurality of points defining the axial centre of each straight line detected. The line detection function is further operable to draw a highlighted best fit line on the electronic image, through each set of image coordinates, corresponding to each detected line. The image coordinates are measured in pixels and represent an individual point on the image.

The intersection detection function is operable to detect each intersection, on the electronic image, between the straight lines detected line detection function. The intersection detection function is further operable to calculate and return the image coordinates of the centre of the intersection nearest to a predefined target position. Alternatively the intersection detection function may be configured to return an alternative intersection by setting a parameter provided for the purpose.

The intersection count function is operable to count and return the number of intersections present on an electronic image.

The zeroing function is operable to set the coordinates of the predefined target position to the position of a detected intersection.

The image analysis software also includes user interface routines operable to allow a user to operate the application software and to manually enter parameters or other data. Typical data a user might enter, for example, include ambient temperature, information relating to the type of image device 18 used, the objective lens magnification, and data relating to any additional features such as a microscope relay lens.

Alternatively or additionally the image analysis software may also be operable to allow the input of an ambient temperature automatically via a temperature sensor connected to the computer via a suitable communications link such as RS232.

The image analysis software also includes means for storing the data returned by the image analysis functions and/or entered by the user in a conventional spreadsheet for viewing and/or editing using other software. It will be appreciated that although a spreadsheet is described the data may be stored in any suitable form, for example, tabular or delimited text form suitable for opening in any suitable software package.

The measurement software includes control routines and data analysis routines.

The control routines are operable to send data and/or commands to and receive data from the controller 16. The control routines are also operable to receive data generated by the image analysis software. In operation, therefore, the control routines may be used to control the movement of the movable platform of the stage 14 via the controller 16 and the positioning means. The control routines may also be used to send data to or receive data from the memory device 28 via the controller 16.

The data analysis routines are operable to analyse the data received via the imaging software for example, to determine metric accuracy, squareness and repeatability for the stage.

Figure 2:
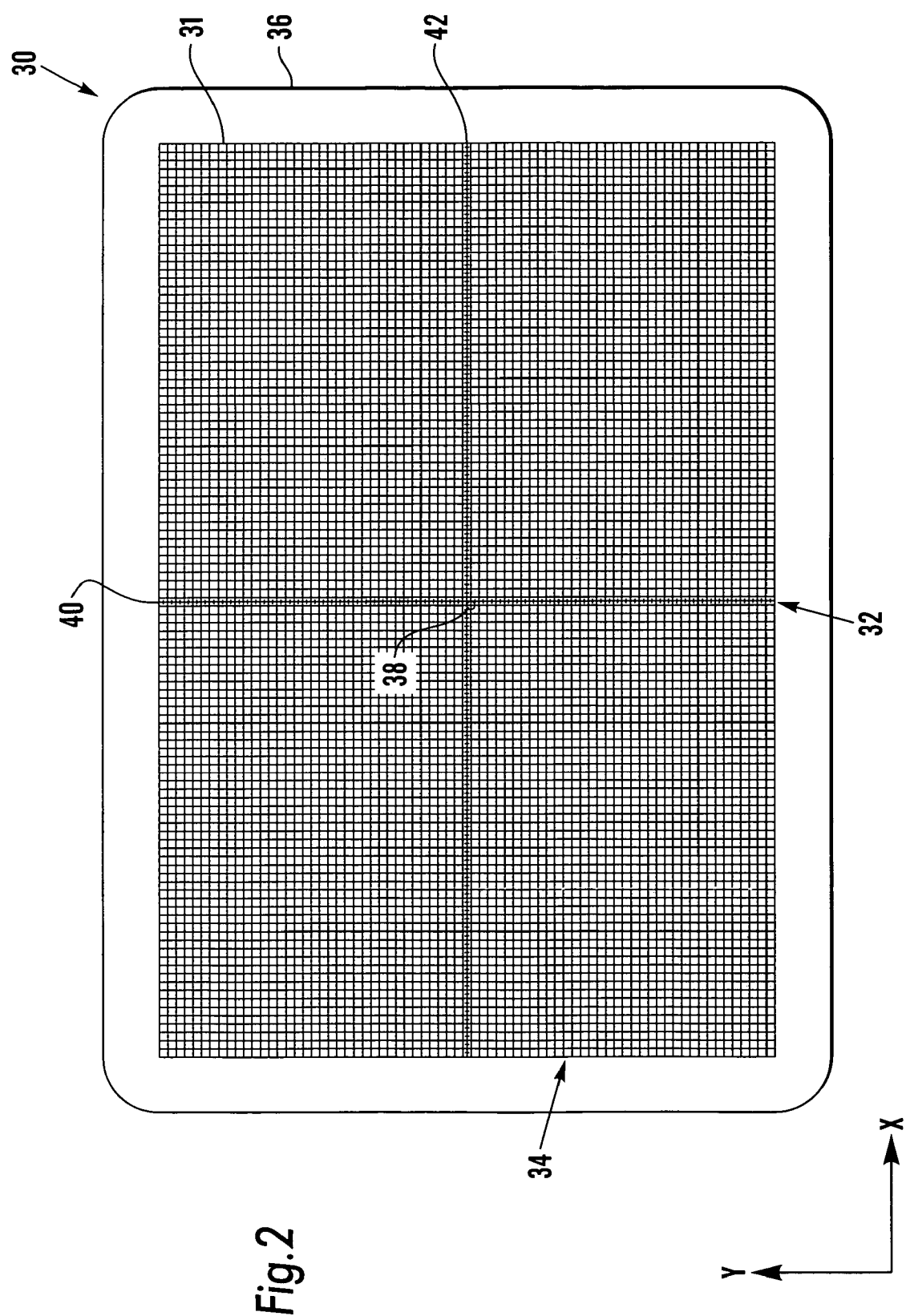
FIG. 2 shows a calibration grid.

In FIG. 2 a calibration plate is shown generally at 30. The calibration plate 30 comprises a calibration pattern 31, provided on the upper surface of a clear glass substrate 36. The calibration pattern 31 comprises an arrangement of regularly spaced detectable features. In the embodiment shown in FIG. 2 the detectable features are intersections formed by a plurality of Y-gridlines 32 and X-gridlines 34 in the form of an orthogonal grid. Preferably the calibration pattern 31 is reflective and the substrate 36 is flat to within 2 wavelengths of green light (1 μm). It will be appreciated that although a glass substrate 36 is described, any other suitable material may be used.

The Y-gridlines 32 and the X-gridlines 34 are equally spaced such that generally, in operation with a ×20 magnification objective lens, only a single gridline intersection can be viewed via the imaging device 18, at any one time. Since the field of view is dependent both on the type of microscope and the imaging device 18 used the optimum grid spacing varies depending on the configuration of the microscopy system. However, gridline spacings of 1 mm are suitable for typical systems.

The width of the gridlines is typically between 4 and 6 μm with a line width variation of less than 1 μm and line straightness of less than 2 μm along the length of the line. The squareness of the grid is typically better than 5 arc seconds.

Additional Y and X graticules (not shown) are provide at suitable intervals forming additional intersections. For example, for a grid with 1 mm gridline spacings, graticules will typically be included at 50 μm intervals.

The pattern 31 is also provided with a circle 38 of suitable diameter, centered at the central coordinate of the grid, to assist in identification of the grid center. For example, for 1 mm grid spacings a diameter of 1 mm is appropriate. The line width of the circle is similar to that of the gridlines 32, 34.

It will be appreciated that although specific dimensions, line spacings, line widths and accuracies are defined the grid may be of any suitable size with appropriate line widths, spacing and accuracies. The size of the pattern 31, for example, may vary depending on the application for which it is required and can be up to ~300 cm wide.

The pattern 31 is further provided with a Y-scale 40 extending the full height of the grid and an X-scale 42 extending the full width of the grid. The Y and X scales 40, 42 intersect at a grid coordinate offset slightly from the central point of the grid, for example, by half a grid spacing in each direction.

It will be appreciated that the calibration pattern 31 described is only an example of one possible pattern suitable for calibrating the stage. It will be obvious to one skilled in the art that other patterns are possible. For example, the calibration pattern 31 may comprise a suitable arrangement of other regularly spaced detectable features such as dots, crosses, squares or the like. Similarly the image analysis software may be adapted to detect, and calculate the image coordinates of the other detectable features.

Additionally the stage 14 is also provided with a stage insert plate for levelling and rotating the calibration plate 30. The stage insert plate includes a lower fixed base configured for detachable connection to the movable platform of the stage 14. The insert plate also includes an upper section including a substantially planar sample surface and means for levelling and rotating the sample surface. The upper section of the stage insert plate is configured to receive the calibration plate 30 such that the lower surface of the calibration plate 30 is adjacent the sample surface and the calibration pattern 31 is clearly visible.

In use the size of the image captured by the imaging device 18 varies depending on the field of view and hence the configuration of the microscopy system. Hence, in order to accurately measure the discrepancies between motor coordinates and stage coordinates, the image analysis software needs to be calibrated to determine the distance represented by each pixel of a captured image.

In operation to calibrate the image analysis software, an operator manually enters data relating to the configuration of the microscopy system 10 and calibration conditions. The data entered includes the ambient temperature, the objective lens magnification, and information relating to the type of image device 18 used and any additional features such as a microscope relay lens. The data entered is stored in a calibration spreadsheet or other suitable form.

The operator fits the calibration plate 30 to the movable platform using the stage insert plate such tat an image of part of the grid is viewable via the imaging device 18. The operator levels the calibration plate 30 and aligns It such that the X-scale 42 is approximately aligned to the X-axis movement of the movable platform.

The operator uses the imaging software to capture an electronic image showing a number of graticule intersections. The intersection detection routine locates the intersections visible on the captured image and calculates the number of pixels between them. Additionally the operator enters the distance between intersections. The application software then calculates the number of screen pixels per unit length by dividing the number of pixels counted, by the distance between them.

Once calibrated a measurement routine may be used to test the metric accuracy, the squareness, and the repeatability of stage positioning for a specific stage.

During the measurement routine the operator initially fits the calibration plate 30 to the movable platform using the stage insert plate such that an image of part of the grid is viewable via the imaging device 18. The operator levels the calibration plate 30 and aligns it such that the X-scale 42 is substantially aligned to the X-axis movement of the movable platform.

The operator manually moves the platform to a first position in which a single intersection is approximately central in the microscopes field of view. The intersection is detected using the intersect detection routine and the corresponding image coordinates calculated and set as the reference position. Typically the first position is such that the central intersection of the calibration grid is visible.

The operator then continues the measurement routine either manually or automatically.

During manual measurement the operator moves the platform, in increments equal to multiples of the grid spacing, to other positions in which other intersections are visible. For each new position the image analysis software detects the intersection and calculates the corresponding image coordinates relative to the reference position. The calculated image coordinates are representative of a positioning error, and hence for each position the positioning error can be determined. The motor coordinates and the corresponding positioning error are stored in the calibration spreadsheet.

During automatic measurement the application software carries out a routine to ensure that the calibration grid is correctly oriented. If the grid is correctly oriented the measurement software systematically moves the movable platform to each grid intersection in turn. The image analysis software captures an electronic image of the intersection, and determines the corresponding image coordinates relative to the reference position. The corresponding positioning error is calculated and stored in the calibration spreadsheet with the corresponding motor coordinates. Alternatively, the application software could be configured to find the positioning error of only a selection of the intersections, for example ever fifth intersection, to save time and/or memory space.

During automatic measurement, the software can also carry out a repeatability test. During the repeatability test the measurement software operates to move the movable platform to a reference position in which an intersection is visible via the imaging device 18. The image analysis software captures an electronic image of the intersection, and determines the corresponding image coordinates, which are ten set as the reference position. The platform is then moved repeatedly from the reference position to at least one other position and back. After each repetition the electronic image is re-captured and any error in positioning calculated and stored in the calibration spreadsheet.

Subsequently the measurement software analyses the data in the calibration spreadsheet and calculates values of metric accuracy, squareness, and repeatability. The calculated values are then compared to a pre-defined specification for the stage. If the calculated values do not conform to the specification then the stage being tested is declared as failed. Otherwise the stage being tested is declared as passed. A summary of the measurement results may also be printed, displayed or stored as appropriate.

After the measurement routine is completed the data stored in the calibration spreadsheet can be analysed either manually or automatically and a stage specific error table generated. The generated error table is stored in the memory device 28 of the stage that has been tested. The error table contains stage specific information relating to the positioning error of the stage for different motor coordinates.

Hence, during operation the application software accesses the stage specific data contained in the error table and compensates for any positioning errors specific to the stage in which the memory device 28 is located. Since the error table is stored in a memory device 28 located in the stage to which the table relates, the stage may be moved from one microscopy system to another without a significant degradation in positioning accuracy.

Additional error tables may also be generated in a similar manner for different temperatures and/or other environmental variables and subsequently stored in the memory device 28. Hence, in operation, the application software can access data stored in an error table corresponding as closely as possible to environmental variables corresponding to conditions at the time of operation. Hence, positioning errors can be compensated for and accuracy improved for a range of conditions.

What is claimed is:

1. Stage apparatus for selective connection to a microscopy system so as to improve the accuracy of microscope stage positioning, comprising:

a stage having a memory device, a fixed portion, and a platform movable relative to the fixed portion, wherein the memory device is located in the stage and is configured to store data relating to the positioning of the platform for the stage, such that the data is accessible to the microscopy system upon connection of the stage apparatus.

2. Stage apparatus as claimed in claim 1, wherein the memory device is an Electrically Erasable Programmable Read-Only Memory (EEPROM).

3. Stage apparatus as claimed in claim 1, wherein the stage apparatus is provided with a calibration plate comprising a calibration pattern formed on a substrate.

4. Stage apparatus as claimed in claim 3, wherein the calibration pattern includes an arrangement of regularly spaced features.

5. Stage apparatus as claimed in claim 4, wherein the features are intersections between gridlines.

* * * * *